(12) United States Patent
Jakobsson et al.

(10) Patent No.: US 8,696,935 B2
(45) Date of Patent: Apr. 15, 2014

(54) PROCESS FOR REFORMING HYDROCARBONS

(75) Inventors: Niklas Bengt Jakobsson, Kågeröd (SE); Anders Helbo Hansen, Copenhagen Ø (DK); Pat A. Han, Smørum (DK)

(73) Assignee: Haldor Topsoe A/S, Lyngby (DK)

( * ) Notice: Subject to any disclaimer, the term of this patent is extended or adjusted under 35 U.S.C. 154(b) by 89 days.

(21) Appl. No.: 13/522,919

(22) PCT Filed: Jan. 18, 2011

(86) PCT No.: PCT/EP2011/000178
§ 371 (c)(1),
(2), (4) Date: Jul. 18, 2012

(87) PCT Pub. No.: WO2011/088981
PCT Pub. Date: Jul. 28, 2011

(65) Prior Publication Data
US 2012/0326090 A1  Dec. 27, 2012

(30) Foreign Application Priority Data
Jan. 19, 2010  (DK) ................. 2010 00039

(51) Int. Cl.
*C01B 3/02* (2006.01)
*C10J 3/00* (2006.01)

(52) U.S. Cl.
USPC .......................... 252/373; 48/197 R

(58) Field of Classification Search
USPC .......... 252/376; 422/610, 187, 240; 48/197 R
See application file for complete search history.

(56) References Cited

U.S. PATENT DOCUMENTS

| 4,376,717 A * | 3/1983 | Lagana' et al. ............. 252/376 |
| 2009/0184293 A1 | 7/2009 | Han |
| 2010/0249251 A1* | 9/2010 | Hilton ........................ 518/702 |

FOREIGN PATENT DOCUMENTS

DE    35 40 782 A1    5/1987
WO    WO 2008/087306 A1    7/2008

* cited by examiner

*Primary Examiner* — Stanley Silverman
*Assistant Examiner* — Syed Iqbal
(74) *Attorney, Agent, or Firm* — Dickstein Shapiro LLP

(57) ABSTRACT

The invention relates to a process for the production of synthesis gas from a hydrocarbon feedstock, wherein the entire hydrocarbon feed is passed through a radiant furnace, heat exchanger reformer and autothermal reformer in a series arrangement, in which effluent gas from the autothermal reformer is used as heat source for the reforming reactions occurring in the heat exchange reformer and wherein a cooling medium is added to the heat exchange reformer.

14 Claims, 1 Drawing Sheet

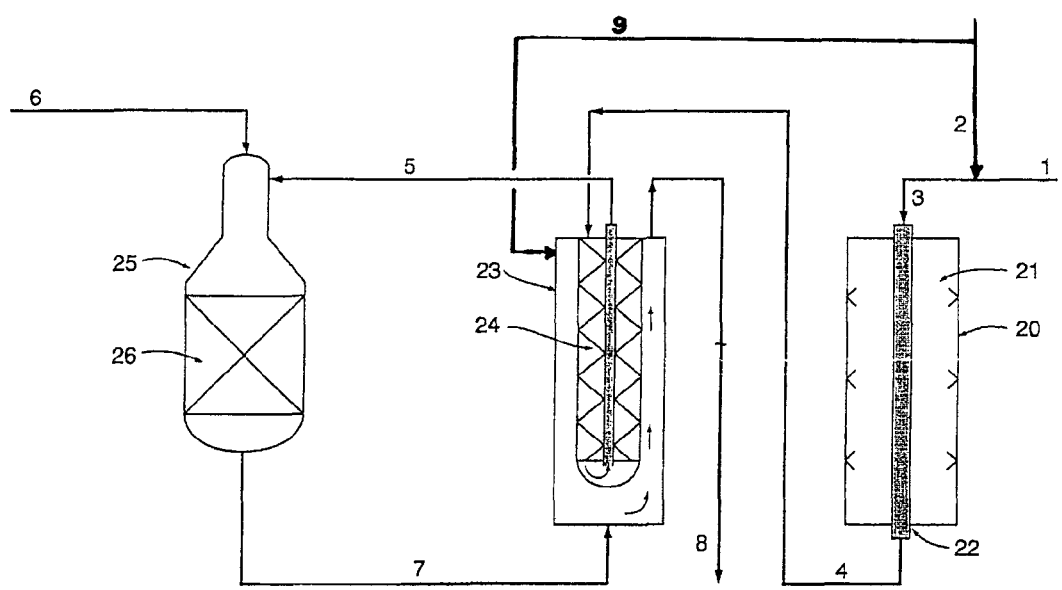

PROCESS FOR REFORMING HYDROCARBONS

The present invention relates to a process for production of gas rich in hydrogen, particularly synthesis gas for the production of ammonia, methanol, dimethyl ether (DME), hydrogen and hydrocarbons by Fischer-Tropsch synthesis. More particularly, the invention relates to the production of synthesis gas by means of a series arrangement of radiant furnace reforming, heat exchange reforming and autothermal reforming stages, in which the heat required for the reactions in the heat exchange reforming stage is provided by hot effluent synthesis gas from the autothermal reforming stage, and a cooling medium is added to the heat exchange reforming stage.

The use of a product stream of reformed gas as a source of heat in heat exchange reforming is known in the art. Thus, EP-A-0033128 and EP-A-0334540 deal with parallel arrangements, in which a hydrocarbon feed is introduced in parallel to a radiant furnace and heat exchange reformer. The partially reformed gas from the radiant furnace is then used as heat source for the reforming reactions in the heat exchange reformer.

Other parallel arrangements combine heat exchange reforming and autothermal reforming. EP-A-0983963, EP-A-1106570 and EP-A-0504471 deal with processes in which a hydrocarbon feed is introduced in parallel to a heat exchange reformer and an autothermal reformer. The hot product synthesis gas from the autothermal reformer is used as a heat exchanging medium for the reforming reactions occurring in the heat exchange reformer.

In many instances it is necessary to incorporate a steam methane reforming stage by means of a radiant furnace in the process. Thus, other processes for the production of synthesis gas combine heat exchange reforming, a radiant furnace and autothermal reforming. U.S. Pat. No. 4,079,017 discloses a process in which a hydrocarbon feed is introduced in parallel to a radiant furnace and heat exchange reformer. The product streams from both reformers are combined and introduced to an autothermal reformer, and the product gas from the autothermal reformer is used as heat source in the heat exchange reformer.

In EP-A-0440258 we disclose a process in which the hydrocarbon feed is first passed through a first heat exchange reformer to provide a partially reformed stream. The partially reformed stream is then introduced in parallel to a radiant furnace and a second heat exchange reformer. The product streams from both reformers are combined and introduced to an autothermal reformer. The product gas from the autothermal reformer is used as heat source in the second heat exchange reformer, while the product gas from said second heat exchange reformer is used as heat source in the first heat exchange reformer.

Series arrangements are also known in the art. Our patent DK 148882 discloses a process for production of synthesis gas, in which the hydrocarbon feed is passed through a heat exchange reformer and an autothermal reformer, and where the product gas from the latter is used as heat source in the heat exchange reformer. U.S. Pat. No. 4,824,658 and U.S. Pat. No. 6,296,679 (FIG. 2 in both references) disclose a process in which the entire hydrocarbon feed is first introduced to a heat exchange reformer, then passed to a radiant furnace and finally to an autothermal reformer. The product gas from the autothermal reformer is used as heat source in the heat exchange reformer.

U.S. Pat. No. 4,376,717 and our US 2009/0184293 disclose a process in which a hydrocarbon feed is first passed through a radiant furnace (tubular reformer); the partially reformed gas is then subjected to heat exchange reforming and finally to autothermal reforming. The product gas from the latter is used as heat source in the heat exchange reforming. In our US 2009/0184293 we found specifically that by providing a process in which the entire hydrocarbon feed is passed through a radiant furnace, a heat exchanger reformer and an autothermal reformer in a series arrangement, the risk of metal dusting is significantly reduced. In otherwise conventional processes such as heat exchange reformers in parallel to or in series with either a radiant furnace or an autothermal reformer, metal parts of the heat exchange reformer experience low temperatures as effluent gas from the autothermal reformer cools during its passage through the heat exchange reformer. Accordingly, metal parts of the heat exchange reformer fall within the prohibitive range of metal dusting temperatures.

JP 59217605 discloses an apparatus having a shift reaction part for CO in addition to a reforming part in a body shell, capable of giving hydrogen from hydrocarbons in a compact apparatus. The reforming reaction receives heat from a combustion catalyst bed.

We have now found that by providing a process in which the entire hydrocarbon feed is passed through a radiant furnace, heat exchanger reformer and an autothermal reformer in a series arrangement, and a cooling medium is added to the heat exchange reformer separately from the actual process gas fed to this reformer, the risk of metal dusting is not only significantly reduced, but a considerably less expensive heat exchange reformer can be realized. Despite the fact that heat exchange reforming is an endothermic process and consequently requires an energy input, the addition of a cooling medium, preferably steam, to the heat exchange reformer creates a cold end in the metal parts of the reformer which makes it possible to construct a relatively cold tube support for the tubes in the reactor. At the same time the steam flow is sufficiently low so that the parts of the reactor being in contact with the cooled gas from the autothermal reformer (or secondary reformer) are still at a sufficient temperature level where the potential for metal dusting is reduced or eliminated. Thus the advantage of keeping the temperature of the reforming tubes above or close to the metal dusting limit is maintained at the same time as a cold end is created, said end allowing the tubes to be supported. This enables the use of materials that are not specially developed to withstand metal dusting, while at the same time the reforming performance is not impaired.

Accordingly, as defined in claim 1 we provide a process for the production of synthesis gas from a hydrocarbon feedstock, comprising the steps of:

(a) reforming the hydrocarbon feedstock by adding steam to said feedstock to form a hydrocarbon-steam mixture, passing the hydrocarbon-steam mixture through a first reforming stage in a radiant furnace provided with a plurality of catalyst tubes which are heated by means of burners arranged within said radiant furnace, and withdrawing a partially reformed hydrocarbon stream;

(b) passing the partially reformed stream from the radiant furnace through a second reforming stage in a heat exchange reformer provided with a plurality of catalyst tubes in indirect heat conducting relationship with at least a portion of hot effluent of synthesis gas from step (c), and withdrawing from the heat exchange reformer a cooled effluent of synthesis gas and an effluent stream of partially reformed hydrocarbon stream;

(c) passing the partially reformed hydrocarbon stream from the heat exchange reformer through an autothermal reforming stage (ATR) provided with a fixed bed of catalyst, or a partial oxidation stage (POx) optionally provided with a fixed bed of catalyst, and withdrawing a hot effluent stream of synthesis gas of which at least a portion is used as heating medium in the heat exchange reformer of step (b), characterised in that the process further comprises adding a cooling medium to the heat exchange reformer of step (b).

Particular embodiments are defined in sub-claims 2 to 10.

By the term "catalyst tubes" is meant tubes filled with particulate catalyst thereby forming a fixed bed, or particularly for the radiant furnace tubes in which the catalyst is adhered as coating or coated in a foil adapted to the inner perimeter of the tube, or tubes in which the catalyst is coated or impregnated on structural elements such as monoliths adapted within the tubes.

By "indirect heat conducting relationship" is meant that there is no direct contact between the catalyst and the heating medium, and thereby between the flow passing through the catalyst and the heating medium because they are separated by a metal wall, i.e. the wall of the tube containing the catalyst.

It is obvious to a person skilled in the art that when producing ammonia, the autothermal reforming stage (ATR) is actually a secondary reforming stage.

In some instances, the partial oxidation stage (POx) is conducted without catalyst, but preferably the partial oxidation stage (POx) is provided with a fixed bed of catalyst.

Preferably, in connection with the above and one or more of the below embodiments the process further comprises adding the cooling medium directly to the tube supporting structure of the heat exchange reformer.

By the term "tube supporting structure" is meant the structure that is in direct contact with the external surface of the catalyst tubes and which mechanically fixes such tubes within the reformer. Hereinafter the tube supporting structure may also be referred as tube sheet.

Accordingly, the cooling medium is introduced at a point in the reactor where it can come into direct contact with the metal parts of the tube sheet and at the same time with the external metal parts of the catalyst tubes traversing said tube sheet. Usually, the tube supporting structure (tube sheet) is positioned in the upper part of the heat exchange reformer. The cooling medium fills the upper reformer chamber created above the tube supporting structure and the tube structure is thereby cooled.

Preferably, in connection with one or more of the above or below embodiments, the process further comprises mixing the cooling medium in the heat exchange reformer with the partially reformed stream from the radiant furnace (first reforming stage of step (a)).

According to a particular embodiment, in connection with the above or below embodiments, the cooling medium is steam. Preferably, the steam is derived from the steam added to the hydrocarbon feedstock during the first reforming stage of step (a).

Accordingly, by the invention it is also possible to move some of the process steam from the inlet of the primary reformer to the heat exchange reformer positioned downstream. The steam is added to the heat exchange reformer in such a way that it cools the tube support before it is mixed with the feed gas to the reformer. This implies that a cold end is created in the reformer which makes it possible to construct a tube support that is mechanically stable. Usually, the tube supporting structure experiences temperatures of about 770° C., which requires the use of expensive materials such as Inconel. The tube supporting structure is not in contact with aggressive gas and it can also be constructed of inexpensive materials, e.g. materials other than Inconel, since the temperature of the tube supporting structure can be significantly reduced, e.g. down to 400 to 450° C.

According to a particular embodiment of the invention, the steam used for cooling is actually mixed into the process gas (hydrocarbon-steam mixture) running through the catalyst tubes of the heat exchange reforming and thereby it takes part in the steam reforming reaction to produce synthesis gas. The overall steam/carbon ratio of the reforming process is not changed, and the methane slip from the reforming section (prior to any subsequent downstream process, such as ammonia synthesis) is maintained.

Yet again, unexpectedly, by adding a cooling medium, preferably steam, to an endothermic reactor (heat exchange reformer), which otherwise requires the addition of heat to support the reforming reaction, we are able to provide a superior process in an elegant and simple way. By placing the heat exchange reformer outside the metal dusting region while at the same time creating a cold end in this reformer, it is possible to construct a relatively cold tube support, and the reformer can still be placed in a temperature region where metal dusting has been eliminated or significantly reduced. In addition, it is now possible to use materials for the metal parts that are not specially developed to withstand metal dusting, thus reducing material cost for the reformer compared to heat exchange reformers operating within the metal dusting region. Moreover, because steam added to the heat exchanging reformer is mixed with the reactant gas within the catalyst tubes it is also possible to have an improved flexibility in steam addition for the reforming reaction without affecting the overall steam/carbon ratio used in the production of the synthesis gas. Since high steam/carbon ratios are directly correlated to a large pipe size, the transfer of some of the steam used in primary reforming, usually 25% or less of the total steam flow, enables the use of a small pipe size, which in turn reduces the capital costs.

The present invention shares some of the advantages already recited in our US 2009/0184293: when the outlet temperature from the catalyst tubes in the radiant furnace is lowered, it is possible to design the catalyst tubes with a lower design temperature and thus at a much lower price than in conventional designs. By the invention, the bottom part of the reformer tubes in the radiant furnace is in a way substituted by a heat exchange reformer arranged in series with the radiant furnace and thereby enabling the design of the reformer tubes in the radiant furnace with a significantly lower design temperature, said radiant furnace also being the hottest part of the reformer and therefore design-giving. In an oxygen fired autothermal reformer (secondary reformer) the inlet temperature of the gas coming directly from a radiant furnace is usually about 800° C. or higher in order to obtain a low methane slip. Instead of having only the radiant furnace to reach the approximately 800° C., it is now possible to reach this inlet temperature to the autothermal reformer by means of a heat exchange reformer immediately following the radiant furnace. This means that the outlet temperature of the radiant furnace is lower, for instance about 770° C. or lower, compared to a situation with only a radiant furnace where the outlet temperature is 800° C. or higher. Then the heat exchange reformer brings the reforming temperature up to the desired level. The required heat for reforming in the heat exchange reformer is supplied by heat exchange with the effluent process gas from the autothermal reformer, viz. the secondary reformer or the partial oxidation unit (POx). By lowering the design temperature of the reformer tubes, it is now also possible to design the radiant furnace to operate at a much higher pressure (55 to 80 bar) than is normal today (25 to 45 bar). Higher pressures are usually necessary when increasing the plant capacity although the thermodynamics of the steam reforming reaction dictate a lower methane conversion. For an ammonia or methanol synthesis, it can be advantageous to operate the radiant furnace at a high pressure such as up to 80 bars and consequently to have the synthesis gas delivered at a higher pressure to the ammonia or methanol synthesis section, since less pressure boosting is required between the synthesis gas section and the ammonia/methanol synthesis section.

The autothermal reforming stage may be conducted with air (21 vol % oxygen) or with enriched air, i.e. a gas containing 30 to 70 vol % $O_2$, more preferably 40 to 50 vol % $O_2$ in order to produce ammonia synthesis gas. The cooled synthesis gas leaving the heat exchange reactor may thus be subjected to carbon monoxide shift conversion for hydrogen enrichment, carbon dioxide removal and methanation in order to produce a synthesis gas having the right ratio of hydrogen and nitrogen for the subsequent ammonia synthesis.

When producing synthesis gas for e.g. hydrogen or methanol production, the autothermal reforming stage may be conducted with a gas containing at least 70 vol % oxygen, preferably 100 vol % oxygen provided by dedicated air separation units.

In principle it is desirable to avoid the use of a radiant furnace and to produce the synthesis gas by the use of only the heat exchange reformer and the autothermal reformer. As for instance ammonia plant capacities are on the rise with novel plants producing as much as 4000 MTPD or even more, the trend in the field has been towards avoiding the use of radiant furnaces and to rather focus on only a catalytic, oxygen based generation of synthesis gas, e.g. autothermal reforming (ATR) or partial oxidation (POx). Yet we find that using a radiant furnace according to the present invention is in fact advantageous as the plant capacity increases. The use of a radiant furnace together with heat exchange reforming and autothermal reforming becomes particularly relevant when the autothermal reforming stage is fired with air, as it is often the case when manufacturing an ammonia synthesis gas. In the absence of a radiant furnace it is necessary to fire the autothermal reformer with enriched air, as defined above, and most often with air containing 70 to 100% vol $O_2$ in order to obtain heat enough in the ATR, which is highly expensive in terms of not only operating costs, but also capital costs because of the need to implement dedicated air separation units.

In the autothermal reforming stage the oxygen introduced is converted by combustion with some of the effluent gas from the heat exchange reformer. Since the combustion reaction is exothermic, the temperature in the ATR is raised to about 1000 to 1050° C., which is also the temperature of the effluent gas leaving this reformer. By the invention the entire stream is also passed through the autothermal reforming stage, said stream containing hydrocarbon feed and not only a portion thereof as in a conventional parallel-feed process. As a result the lowest possible methane slip is obtained as all the feed is subjected to the highest reforming temperature therein.

The molar steam-to-carbon ratio (S/C-ratio) in the hydrocarbon-steam mixture entering the radiant furnace is usually in the range 1.5 to 3 in order to prevent an undesired methane production from the reforming steps. For the production of ammonia synthesis gas a suitable S/C-ratio is 3. Lower S/C-ratios, such as 2 or 2.5, contribute to the reduction of a mass flow through the process and allows thereby a reduced size of equipment. However, the methane slip from the ATR increases and it becomes more difficult to maintain a suitable temperature difference between the outlet temperature of the radiant furnace and the Boudouard temperature of the gas or the equilibrium temperature for CO reduction. These temperatures are the temperatures below which a carbon monoxide containing gas has the potential for carbon formation following the Boudouard reaction $2 CO = C + CO_2$ or the CO reduction reaction $CO + H_2 = C + H_2O$. When the partial pressure of carbon monoxide is high and the gas is in contact with a metal surface at a temperature below the Boudouard temperature or CO reduction temperature, the above reactions are catalyzed by the metal surface. If the temperature of the gas entering the heat exchange reformer is so low that the metal temperature drops below the Boudouard temperature or the CO reduction temperature, a highly undesired carbon deposition on the metal surface and/or metal dusting may occur. By the invention it is now possible to lower the outlet temperature of the gas in the radiant furnace, while the temperature is kept high enough to be outside the range of metal dusting in the heat exchange reformer. At the same time it is possible to conduct the process with an S/C-ratio as low as 2.5 or even lower with a methane slip which is still within acceptable levels, i.e. below about 0.4 dry mole % $CH_4$ in the effluent gas (synthesis gas) from the autothermal reforming stage for a process producing ammonia synthesis gas.

According to the invention at least a portion of the hot effluent from the autothermal reformer is used as heating medium in the heat exchange reformer. According to a preferred embodiment, in connection with the above or below embodiments, all the hot effluent of the synthesis gas from the autothermal reformer step (from step (c)) is used as heating medium in the heat exchange reformer.

In connection with one or more of the above or below embodiments, the heat exchange reformer is preferably selected from a bayonet tube type reactor, a tube and shell heat exchanger and a double-tube reactor with catalyst disposed inside the double tubes, catalyst disposed outside the double tubes, and catalyst disposed outside and inside the double tubes, respectively.

According to a particular embodiment of the bayonet tube type reactor, at least one catalyst tube (reformer tube) in this reformer is provided in the form of an outer and an inner tube, the outer tube being a U-shaped tube and provided with a reforming catalyst and the inner tube being adapted concentrically to withdraw an effluent stream of partly reformed hydrocarbon from the outer tube, the outer tube being concentrically surrounded by a sleeve spaced apart the outer tube and being adapted to pass the hot effluent stream from the autothermal reformer (or secondary reformer) in indirect heat conducting relationship with reacting feedstock in the outer tube by conducting the hot effluent stream in the space between the sleeve and the outer tube.

For the bayonet tube type reactor, the steam in the chamber is mixed outside the catalyst tubes. The steam comes into direct contact with the tube structure, engulfs the portion of all the catalyst tubes traversing the tube structure, permeates the tube structure through for instance an aperture close to the catalyst tube, and mixes with incoming feed gas. The combined gas enters at the top of the catalyst tubes and flows downward inside the catalyst tubes. Because of the high pressure of the steam in the chamber, the steam is forced to enter the catalyst tubes and thereby to participate in the reforming reaction.

When the heat exchange reformer is a tube and shell heat exchanger, it is preferred that the partly reformed stream leaving the catalyst tubes in the heat exchange reformer is conducted to the autothermal reformer (or secondary reformer) while the hot effluent gas from the autothermal reformer is conducted through the shell side of the heat exchange reformer for an indirect heating of reforming reactions proceeding within the catalyst tubes.

When the heat exchange, reformer is a double-tube reactor with catalyst disposed inside the double tubes, catalyst disposed outside the double tubes, and catalyst disposed outside and inside the double tubes, effluent gas from the autothermal reforming stage passes through the annular region of the double tubes, while the gas to be further reformed is conducted through the catalyst arranged inside the double tubes and optionally also outside the double tubes. A double-tube is basically an arrangement of two substantially concentric tubes. The space between the tubes walls defines the annular region through which a heat-exchanging medium flows, in this case effluent from the autothermal reforming stage (or secondary reforming stage).

In particular when the heat exchange reformer is a double-tube reactor with catalyst disposed inside the double-tubes, such catalyst tubes may also be defined by a single catalyst tube surrounded by a sleeve or metal shroud which is spaced apart the catalyst tube and which creates an annular region through which the heating medium can pass. The sleeve or metal shroud need not be part of the catalyst tube as such, but serves to create the annular region. In this type of reformer, the steam simply enters each catalyst tube through tube apertures such as slots rather than engulfing all tubes as in the bayonet type reformer, said slots being provided along the length of the upper portion of the catalyst tubes. The steam mixes with the feed gas entering at the top of the tubes inside the catalyst tubes in order to participate in the reforming reaction taking place downstream where the combined gas contacts the catalyst.

In yet another embodiment of the process in connection with the above or below embodiments, the invention further comprises passing the hydrocarbon feedstock through an adiabatic pre-reforming stage prior to conducting said first reforming stage in the radiant furnace. There is a higher propensity for the reforming catalyst in the radiant furnace to deactivate by the presence of sulphur as the outlet temperature of the reforming tubes in the radiant furnace decreases. The provision of a pre-reforming stage in the form of adiabatic reforming by passage through a fixed bed of pre-reforming catalyst, such as a nickel based catalyst, enables removal of any traces of sulphur in the hydrocarbon feed and as a result poisoning of downstream catalyst in the radiant furnace and other downstream processes such as CO-shift conversion is eliminated. The pre-reforming stage removes sulphur and delivers a gas containing only $CH_4$, $H_2$, CO, $CO_2$ and $H_2O$, which is an ideal hydrocarbon feed for the downstream reformer units. The hydrocarbon feedstock is normally mixed with process steam before entering the adiabatic pre-reforming stage, whereby particularly higher hydrocarbons such as LPG or naphtha are converted to carbon oxides and methane.

In a further embodiment in connection with one or more of the above embodiments, after having delivered heat for the reforming reactions in the heat exchange reactor, the thus cooled synthesis gas from the autothermal reforming stage, as recited in sub-claim 9, is further processed according to its end use by converting the effluent synthesis gas into ammonia synthesis gas, methanol synthesis gas, DME synthesis gas, synthesis gas for production of hydrocarbons by Fischer-Tropsch synthesis, or hydrogen.

In summary, the process of the invention provides the following advantages:

Less duty required in the primary reformer which leads to a smaller primary reformer Lower design temperature in the primary reformer allowing for lower tube wall thickness Entire process gas flow goes through the secondary reformer enabling a maintained low methane slip. For ammonia applications this results in less purge from the ammonia synthesis loop Cheaper construction materials; more inexpensive heat exchange reformer Higher front-end pressure possible (higher pressure in the synthesis gas preparation section)

Increased energy efficiency related to $CO_2$ removal

Smaller pipe size

The accompanying FIGURE shows a flow diagram of a particular embodiment of the invention comprising steam reforming in a radiant furnace, heat exchange reforming and autothermal reforming arranged in series, and in which the heat exchange reformer is a bayonet type reactor.

A desulfurised and preheated natural gas stream 1 is mixed with stream 2 containing most of the steam used in the process in order to provide a hydrocarbon-steam mixture 3 with S/C-ratio of 2.5. The hydrocarbon feed stream 3 is introduced to radiant furnace 20 having a number of burners 21 and catalyst filled tubes 22 arranged therein. A partially reformed hydrocarbon stream 4 having a temperature of 770° C. is withdrawn from the radiant furnace 20 and passed to a heat exchange reformer 23 having disposed therein a number of reforming catalyst tubes 24 of the bayonet type containing reforming catalyst. The balance of the process steam is introduced as cooling medium 9 at 380° C. in the heat exchange reformer 23 before mixing with the partially reformed gas inside the catalyst tubes 24. The hydrocarbon stream 4 is mixed with stream 9, which has acted as cooling medium (cooling gas) prior to the mixing. The resulting mixture is then further converted as it passes through the catalyst filled tubes with heat provided by product gas stream 7 at about 1030° C. from autothermal reformer 25 and leaving through the inner tube as partially reformed stream 5 at 825° C. Process gas stream 5 from the heat exchange reformer is fed to the autothermal reformer 25 having arranged therein a fixed bed of catalyst 26. In the autothermal reformer feed stream 5 is reacted with a stream 6 of oxidant such as air, oxygen enriched air or pure oxygen. A hot effluent stream 7 at about 1030° C. of synthesis gas is withdrawn. This product gas stream 7 contains hydrogen, carbon monoxide, carbon dioxide, as well as any residual methane, steam and inerts in the form of nitrogen and argon introduced with oxidant stream 6. After having delivered heat to the heat exchange reformer a cooled product gas stream 8 at 790° C. and containing synthesis gas is withdrawn for further processing as ammonia synthesis gas, methanol/DME synthesis gas and hydrocarbon synthesis by Fischer-Tropsch or for hydrogen production.

Features of the Invention

1. Process for the production of synthesis gas from a hydrocarbon feedstock, comprising the steps of:

(a) reforming the hydrocarbon feedstock by adding steam to said feedstock to form a hydrocarbon-steam mixture, passing the hydrocarbon-steam mixture through a first reforming stage in a radiant furnace provided with a plurality of catalyst tubes which are heated by means of burners arranged within said radiant furnace, and withdrawing a partially reformed hydrocarbon stream;

(b) passing the partially reformed stream from the radiant furnace through a second reforming stage in a heat exchange reformer provided with a plurality of catalyst tubes in indirect heat conducting relationship with at least a portion of hot effluent of synthesis gas from step (c), and withdrawing from the heat exchange reformer a cooled effluent of synthesis gas and an effluent stream of partially reformed hydrocarbon stream;
(c) passing the partially reformed hydrocarbon stream from the heat exchange reformer through an autothermal reforming stage (ATR) provided with a fixed bed of catalyst, or partial oxidation stage (POx), and withdrawing a hot effluent stream of synthesis gas of which at least a portion is used as heating medium in the heat exchange reformer of step (b); characterised in that the process further comprises adding a cooling medium to the heat exchange reformer of step (b).
2. Process according to feature 1, wherein the process further comprises adding the cooling medium directly to the tube supporting structure of the heat exchange reformer.
3. Process according to feature 1 or 2, wherein the process further comprises mixing the cooling medium in the heat exchange reformer with the partially reformed stream from the radiant furnace.
4. Process according to any of features 1 to 3, wherein the cooling medium is steam.
5. Process according to feature 4, wherein the steam is derived from the steam added to the hydrocarbon feedstock in the first reforming stage of step (a).
6. Process according to any of features 1 to 5, wherein all the hot effluent of synthesis gas from step (c) is used as heating medium in the heat exchange reformer of step (b).
7. Process according to any of features 1 to 6, wherein
said partially reformed hydrocarbon stream has a temperature of 700° C. to 840° C., preferably 750° C. to 790° C.;
said cooling medium has a temperature of 340° C. to 420° C., preferably 370° C. to 390° C.;
said partially reformed hydrocarbon stream has a temperature of 745° C. to 905° C., preferably 800° C. to 850° C.;
said hot effluent stream of synthesis gas has a temperature of 930° C. to 1130° C., preferably 1000° C. to 1060° C.
and said cooled effluent of synthesis gas has a temperature of 710° C. to 870° C., preferably 750° C. to 810° C.
8. Process according to any of features 1 to 7, wherein the heat exchange reformer is selected from a bayonet tube type reactor, tube and shell heat exchanger and double-tube reactor with catalyst disposed inside the double tubes, catalyst disposed outside the double tubes, and catalyst disposed outside and inside the double tubes.
9. Process according to any of features 1-8, further comprising passing the hydrocarbon feedstock through an adiabatic pre-reforming stage prior to conducting said first reforming stage in the radiant furnace.
10. Process according to any of features 1 to 9 further comprising converting the effluent of synthesis gas of step (b) into ammonia synthesis gas, methanol synthesis gas, DME synthesis gas, synthesis gas for production of hydrocarbons by Fischer-Tropsch synthesis, or hydrogen.

EXAMPLE

Table 1 shows the wall temperatures of a 6 m long catalyst tube of the bayonet type containing an inner tube, outer tube and sleeve as described above in a heat exchange reformer treating 386000 Nm³/h of process gas from the radiant furnace and operating at 37 bar g for a process according to a layout as depicted in the accompanying FIGURE. The S/C-ratio in the hydrocarbon mixture-steam entering the radiant furnace is 2.5 and process air with 21 vol % oxygen is injected to the ATR. The outlet temperature of the gas from the radiant furnace is 770° C. and the temperature of the effluent gas from the ATR is 1029° C. At the bottom of the catalyst tube, the wall temperature is 897° C. and as the synthesis gas from the ATR cools on its passage through the heat exchange reformer the wall temperature of the catalyst tube decreases. At the top of the tube, where the synthesis gas leaves the heat exchange reactor, the synthesis gas temperature has decreased to 789° C., while the tube wall temperature has decreased to 782° C. Yet this wall temperature is high enough to be outside the temperature where there is risk for metal dusting (up to 750° C.). At the top of the reformer, where it is coldest, the tube sheet would normally experience a temperature of 770C. Part of the process steam, approximately 40 t/h, corresponding to 18.5% vol of the total steam used in the process, bypasses the primary reforming stage and is added separately to the heat exchange reformer as stream 9. The tube sheet experiences thereby a temperature of 425° C., which enables the use of cheaper materials in the heat exchange reformer without affecting the reforming performance. 623,000 Nm³/h of synthesis gas leaves the ATR and thereby also the heat exchange reformer to downstream process with a methane slip of 0.22 dry mole %. Normally a methane slip of below about 0.4 dry mole % is considered to be low.

TABLE 1

| Axial distance from inlet (%) | Temperature of gas from ATR (° C.) | Tube wall temperature (° C.) |
| --- | --- | --- |
| 0 (top) | 789 | 782 |
| 10 | 802 | 775 |
| 20 | 820 | 787 |
| 30 | 833 | 798 |
| 40 | 857 | 815 |
| 50 | 866 | 836 |
| 60 | 908 | 852 |
| 80 | 973 | 863 |
| 100 (bottom) | 1029 | 897 |

The invention claimed is:
1. Process for the production of synthesis gas from a hydrocarbon feedstock, comprising the steps of:
(a) reforming the hydrocarbon feedstock by adding steam to said feedstock to form a hydrocarbon-steam mixture, passing the hydrocarbon-steam mixture through a first reforming stage in a radiant furnace provided with a plurality of catalyst tubes which are heated by means of burners arranged within said radiant furnace, and withdrawing a partially reformed hydrocarbon stream;
(b) passing the partially reformed stream from the radiant furnace through a second reforming stage in a heat exchange reformer provided with a plurality of catalyst tubes in indirect heat conducting relationship with at least a portion of hot effluent of synthesis gas from step (c), and withdrawing from the heat exchange reformer a cooled effluent of synthesis gas and an effluent stream of partially reformed hydrocarbon stream;
(c) passing the partially reformed hydrocarbon stream from the heat exchange reformer through an autothermal reforming stage (ATR) provided with a fixed bed of catalyst, or partial oxidation stage (POx), and withdrawing a hot effluent stream of synthesis gas of which at least a portion is used as heating medium in the heat exchange reformer of step (b);
wherein the process further comprises adding a cooling medium in the form of steam to the heat exchange reformer of step (b) and mixing the cooling medium in the heat exchange reformer with the partially reformed stream from the radiant furnace.

2. Process according to claim 1, wherein the process further comprises adding the cooling medium directly to the plurality of catalyst tubes of the heat exchange reformer.

3. Process according to claim 1, wherein the cooling medium in the form of steam of step (b) is derived from the steam added to the hydrocarbon feedstock in the first reforming stage of step (a).

4. Process according to claim 1, wherein all the hot effluent of synthesis gas from step (c) is used as heating medium in the heat exchange reformer of step (b).

5. Process according to claim 1, wherein
said partially reformed hydrocarbon stream has a temperature of 700° C. to 840° C.;
said cooling medium has a temperature of 340° C. to 420° C.;
said hot effluent stream of synthesis gas has a temperature of 930° C. to 1130° C.; and
said cooled effluent of synthesis gas has a temperature of 710° C. to 870° C.

6. Process according to claim 1, wherein the heat exchange reformer is selected from a bayonet tube type reactor, tube and shell heat exchanger and double-tube reactor with catalyst disposed inside the double tubes, catalyst disposed outside the double tubes, and catalyst disposed outside and inside the double tubes.

7. Process according to claim 1, further comprising passing the hydrocarbon feedstock through an adiabatic pre-reforming stage prior to conducting said first reforming stage in the radiant furnace.

8. Process according to claim 1, further comprising converting the effluent of synthesis gas of step (b) into ammonia synthesis gas, methanol synthesis gas, DME synthesis gas, synthesis gas for production of hydrocarbons by Fischer-Tropsch synthesis, or hydrogen.

9. Process according to claim 1, wherein said partially reformed hydrocarbon stream has a temperature of 750° C. to 790° C.

10. Process according to claim 1, wherein said cooling medium has a temperature of 370° C. to 390° C.

11. Process according to claim 1, wherein said partially reformed hydrocarbon stream has a temperature of 745° C. to 905° C.

12. Process according to claim 1, wherein said partially reformed hydrocarbon stream has a temperature of 800° C. to 850° C.

13. Process according to claim 1, wherein said hot effluent stream of synthesis gas has a temperature of 1000° C. to 1060° C.

14. Process according to claim 1, wherein said cooled effluent of synthesis gas has a temperature of 750° C. to 870° C.

* * * * *